(12) United States Patent
Storm

(10) Patent No.: US 8,352,316 B2
(45) Date of Patent: Jan. 8, 2013

(54) METHOD OF USING A SUBDOMAIN PORTION OF A DOMAIN NAME TO PASS A UNIQUE TRACKING CODE

(75) Inventor: Timothy C. Storm, Rockton, IL (US)

(73) Assignee: Fatwallet, Inc., Beloit, WI (US)

( * ) Notice: Subject to any disclaimer, the term of this patent is extended or adjusted under 35 U.S.C. 154(b) by 872 days.

(21) Appl. No.: 11/782,757

(22) Filed: Jul. 25, 2007

(65) Prior Publication Data

US 2008/0027809 A1    Jan. 31, 2008

Related U.S. Application Data

(60) Provisional application No. 60/820,570, filed on Jul. 27, 2006.

(51) Int. Cl.
*G06Q 30/00* (2006.01)
(52) U.S. Cl. .................................. 705/14.16
(58) Field of Classification Search ............. 705/14.46
See application file for complete search history.

(56) References Cited

U.S. PATENT DOCUMENTS

| 5,712,979 | A | | 1/1998 | Graber et al. | |
| 5,717,860 | A | | 2/1998 | Graber et al. | |
| 5,812,769 | A | * | 9/1998 | Graber et al. | 705/14 |
| 6,029,141 | A | * | 2/2000 | Bezos et al. | 705/10 |
| 7,032,168 | B1 | * | 4/2006 | Gerace et al. | 705/14 |
| 7,085,817 | B1 | | 8/2006 | Tock et al. | |
| 2004/0267610 | A1 | * | 12/2004 | Gossett et al. | 705/14 |
| 2007/0219871 | A1 | * | 9/2007 | Rolf et al. | 705/26 |

* cited by examiner

*Primary Examiner* — Michael Bekerman
(74) *Attorney, Agent, or Firm* — Reinhart Boerner Van Deuren P.C.

(57) ABSTRACT

A method of verifying the identify of an affiliate enrolled in an affiliate program of a merchant and then transmitting information between the affiliate and the merchant is provided. The method relies on embedding a unique identification code in a sub-domain portion of a domain name. Once an identification process has been completed, a server-to-server exchange of information is able to freely continue throughout a shopping session and even beyond checkout to easily handle post transaction changes, returns, cancellations, modifications, shipment notifications, status notifications, and the like.

4 Claims, 1 Drawing Sheet

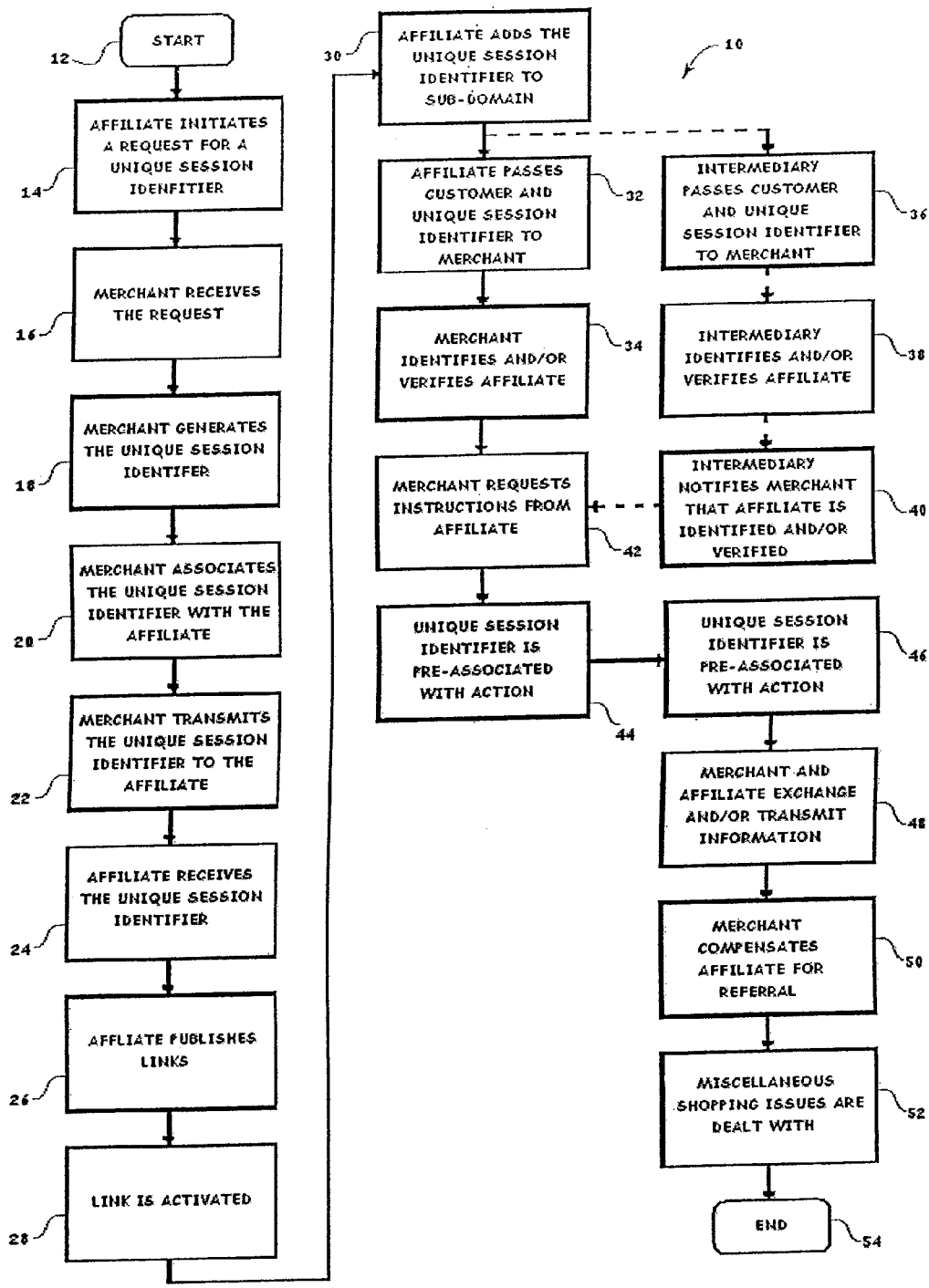

METHOD OF USING A SUBDOMAIN PORTION OF A DOMAIN NAME TO PASS A UNIQUE TRACKING CODE

CROSS-REFERENCE TO RELATED PATENT APPLICATIONS

This patent application claims the benefit of U.S. Provisional Patent Application No. 60/820,570, filed Jul. 27, 2006, the entire teachings and disclosure of which are hereby incorporated in their entireties by reference thereto.

FIELD OF THE INVENTION

This invention generally relates to electronic commerce methods and, more particularly, to the transmission or exchange of information between electronic commerce merchants, their affiliates, and in some cases specific third parties.

BACKGROUND OF THE INVENTION

Merchants often operate electronic commerce (or e-commerce) websites using the World Wide Web (WWW) on the Internet to sell goods and services. Therefore, potential and actual customers (hereinafter collectively, "customers") are able to more easily find and purchase the goods and services using, for example, an Internet-enabled computer having a web browser.

Those merchants having e-commerce websites are continually attempting to increase the number of customers visiting their website. To that end, the merchants often spend a great deal of time and money advertising. However, as many merchants have discovered, trying to effectively advertise using conventional methods such as, for example, through television, newspaper, and Internet advertisements, is very expensive and not particularly effective.

As an alternative or supplement to advertising, many merchants have set up affiliate or associate (hereinafter collectively, "affiliate") programs. Under these affiliate programs, affiliates who register with the merchant are compensated by the merchant for directing or referring customers to the merchant's website. In the end, these affiliate programs are often less costly for the merchant to implement and administer compared to the expense of traditional advertising. In addition, these affiliate programs often lead to substantially increased sales of goods and services for the merchant.

Unfortunately, known affiliate programs have drawbacks. For example, some of the affiliate programs rely on a scripting programming language (e.g., JavaScript) and/or a web browser in order to identify the particular affiliate making the referral and thereafter exchange or transmit information between the merchant and the affiliate. While this method of identifying affiliates and supplying information is functional, it is not ideal.

In addition to using scripting and the web browser, some of the affiliate programs add variables to a universal or uniform resource locator (URL) string. This informs the merchant which affiliate provided the referral. For example, when a user of the web browser is investigating or viewing the website of the registered affiliate (at, for example, affiliate15.com) and the user "clicks" on a link for kayaks, which the merchant sells on the merchant's website (at, for example, merchant.com\kayaks.html), the affiliate's website generates the URL string of merchaniser.com\affiliate15\kayaks.html. The URL string includes the affiliate's unique identification number imbedded therein and, at the same time, takes the user to the merchant's page where the kayaks are available for purchase. As a result, the merchant is informed that affiliate number fifteen was the source of referral and the user is able to view the desired goods. While this method of identifying affiliates is functional, it also has limitations.

There exists, therefore, a need in the art for an affiliate program that passes a unique identification tracking code to a merchant who operates an e-commerce website (or to a third party) such that a secure server-to-server transfer or exchange of information can occur between the affiliate and the merchant and the merchant can conveniently track the source of the referral. The invention provides such an affiliate program. These and other advantages of the invention, as well as additional inventive features, will be apparent from the description of the invention provided herein.

BRIEF SUMMARY OF THE INVENTION

The invention provides a method of using a sub-domain portion of a domain name to pass a unique tracking code to a merchant. The unique tracking code permits identification and/or verification of an affiliate such that a safe and secure exchange or transmission of information can occur between the merchant and the affiliate. The invention also permits tracking of a referring affiliate by a merchant throughout and after an e-commerce transaction using the unique tracking code.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

The FIGURE is an exemplary embodiment of a method of using a sub-domain portion of a domain name to pass a unique tracking code to a merchant in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the FIGURE, a method 10 of using a domain name to pass a unique tracking code to a merchant having an affiliate referral program is illustrated. As will be more fully explained below, the method 10 permits a secure server-to-server exchange of information to occur by identifying and verifying an affiliate with a unique session identifier (a.k.a., a unique identification tracking code). In addition, the method enables the merchant to better track a particular affiliate as the source of a referral.

The method begins or starts 12 when the affiliate initiates 14 a request for a unique session identifier (a.k.a., a unique tracking code) from the merchant. More specifically, the web server of the affiliate makes the request and directs that request to the web server of the merchant. In one embodiment, the request is transmitted through a network such as, for example, a wide area network (WAN) or the Internet.

After the merchant receives 16 the request, the merchant generates 18 the unique session identifier. The merchant then associates 20 the unique session identifier that was just generated with the particular affiliate who just made the request 14, and that affiliate only. All other affiliates that might be enrolled in the affiliate program with that merchant or who make or made such a request are assigned their own unique session identifier. In that way, the unique session identifier is exclusively assigned to each affiliate.

The unique session identifier is, in some cases, only one or a few characters in length. In other situations, the unique session identifier is several characters long. In one embodiment, the unique session identifier includes numerals, letters, text, phrases, spaces, characters, symbols, or combinations thereof.

After being generated 18 and associated 20 with the affiliate, the unique session identifier is transmitted 22 from the merchant to the affiliate. Like before, in one embodiment this transmission 22 occurs through a network. Once the unique session identifier has been received 24 by the affiliate, the affiliate publishes 26 one or more of their own hyperlinks (a.k.a., links) on their web site (at, for example, affiliate.com), in an electronic mail (e-mail) message, and the like. These links might appear as, for example, affiliate.com/merchantname, affiliate.com/merchantoffer, and so on.

After publication 26, the link is now visible and accessible to the customer. Therefore, when the customer is browsing an affiliate's website using a web browser (e.g., Internet Explorer) or other specialty software on a networked machine (e.g., an Internet-enabled personal computer (PC), a wireless handheld device, a cell phone, etc.) or is reading an e-mail message, the user may find that particular goods and/or services offered by the merchant are appealing. Therefore, the user activates 28 one of the above-noted links, which will ultimately lead the customer to the merchant's website (at, for example, merchant.com).

The customer is able to activate 28 the link by, for example, moving a cursor over the link with an input device (e.g., a mouse, a keyboard, etc.) operably coupled to the PC and actuating the input device (e.g., by depressing one of the buttons found on the mouse). This process is often referred to as "clicking" on the link. As well known to those skilled in the art, the link may appear on the affiliate's website as a word or phrase, an underlined word or phrase, an image or as some other object.

After the link has been activated 28 by the customer, a common redirection system on the affiliate website adds 30 the unique session identifier to a sub-domain portion of the merchant's domain name. For example, the affiliate's website generates the following URL string: uniquesessionindentifier.merchant.com/. In addition to using the sub-domain portion of the domain name, in one embodiment further sub-domains of the sub-domain (i.e., a sub-sub-domain) are used. Basically, any portion of the URL string to the left of the domain name can be used as a sub-domain. With the unique session identifier embedded in the sub-domain portion of the domain name, the common redirection link system on the affiliate's website passes 32 the customer and the unique session identifier (a.k.a., unique tracking code) to the merchant's website. The passing of the customer and the unique session identifier can be performed simultaneously or in succession.

When the unique session identifier and customer have arrived at the merchant's website, the unique session identifier conveyed in the sub-domain portion of the domain name is used to, for example, identify the affiliate and/or verify that the affiliate is registered with the established affiliate program 34. When registered with the affiliate program, the affiliate is authorized by the merchant to provide referrals. This process of identifying and/or verifying the registration of the affiliate 34 is, hereinafter, collectively referred to as "the identification process." Because the unique session identifier was previously associated 20 with a particular affiliate, the merchant is able to quickly and easily correlate the unique session identifier with the affiliate who just provided the referral.

In one embodiment, as shown in the FIGURE, the common redirection link system on the affiliate's website passes 36 the customer and the unique session identifier to an intermediate website or third party instead of directly to the merchant's website. When involved in the method 10, the intermediate website generally acts as a liaison between the affiliate and the merchant. Like with the merchant website, the intermediary website utilizes the unique session identifier to identify and/or verify the registration of the affiliate making the referral 38. The intermediary website then notifies 40 the merchant that the affiliate has been identified and/or verified.

In the above embodiment, the intermediate website may be, for example, a secure shopping service website. Such an intermediary website is often operated by an independent third party such as Linkshare of New York, N.Y. and San Francisco, Calif. However, the intermediary website may also be operated by a party related to the operator of the destination website such as a subsidiary company. For example, some large and well established e-commerce merchants (e.g., eBay of San Jose, Calif.) offer their own payment services (e.g., PayPal of San Jose, Calif.) to those who purchase from their website.

Continuing, the merchant then generally requests 42 information from the affiliate, perhaps through the intermediary acting as a go-between, about how to handle and/or what to do with the customer who was just referred. In response to this request 42, the affiliate provides 44 the requested instructions to the merchant. Alternatively or in addition, the merchant pre-associates 46 the unique session identifier with a selected action such as, for example, open a shopping cart with a particular item therein. Thereafter, the customer continues to shop and browse products on the merchant's website as normal.

Advantageously, because the unique session identifier remains within the URL string, and particularly the sub-domain portion of the domain, during all or a good portion of the customer's shopping experience, the identity of the affiliate who referred the customer to the merchant is not lost or misplaced. The customer and/or the referring affiliate are identified by and through the unique session identifier (a.k.a., unique tracking code). In other words, the unique session identifier enables the destination website to identify and verify the originating website.

In one embodiment, during the identification process 34, 38, the merchant or third party accesses look-up tables. These look-up tables contain, among other things, the unique session identifier for each of the several affiliates who are registered and/or authorized to participate in the affiliate program. All of the issued unique session identifiers are organized in the look-up tables such that they specifically correspond to one of the affiliates. Therefore, the unique session identifier sent back to the merchant from the affiliate is, using the look-up tables, quickly and easily connected to the correct affiliate by the merchant.

Once the identification process using the unique session identifier and/or the particulars of how to handle the referred customer are completed, the affiliate and the merchant are now able to safely and securely exchange or transmit 48 a variety of information and data. This information exchange generally occurs on a server-to-server basis. This has the effect of removing one or more of the user, the personal computer, the browser, and the need for scripting from the process of exchanging and transferring information and data. In one embodiment, the exchange or transmission of information and data is performed on either or both of a real-time and ad hoc basis.

The information and data transmitted or exchanged includes, for example, the domain name of the destination site, the domain name of the affiliate or referral site, the name and address of the user (i.e., the customer), the shopping history of the user, the search string or terms entered into the browser by the user to find the goods or services on the affiliate's website, the search engine used, the browser used, the placement and location of the advertisement clicked on by the user, the competitor's websites visited, any comparison shopping performed by the user, the method of payment used or preferred by the customer (e.g., by credit card, using an account established through a third party intermediary, etc.), any coupons or codes used by the customer, the contents of the shopping cart, and the like.

In one embodiment, the information and data specifically includes, but is not limited to, the affiliate partner identifier or full information, the destination merchant address, the products to automatically add to a shopping cart, the notification method for successful redirection confirmation, the notifications methods related to the shopping cart and shopping cart status, the notification for an abandoned session or lost referral chain, the notification methods related to orders, the notification method for product return and shipping status, and the notification method for commission reporting. The data and information may also include the link location from the referrer site, the link type from the referrer site, discount code and coupon information, and the like. In one embodiment, the receiving site tracks the information and data that was exchanged, executes final relocation of the user to the destination website, and/or sends a confirmation that the user has landed at the destination website.

After one or more of the above-noted steps is completed, the merchant is able to compensate 50 the appropriate affiliate for the referral using the unique session identifier as a tracking device. As previously noted, the unique session identifier is specifically associated with only one affiliate. When the merchant receives the unique session identifier back from the affiliate, the merchant simply checks to see which of the affiliates was assigned to that unique session identifier. In other words, the merchant is able to use the unique session identifier during the compensation step to correlate the purchase by the customer with the referral by the affiliate. Therefore, the merchant is able to track the source of the referral much better than before. With the unique session identifier involved, the chance of paying the wrong affiliate or not accounting to the affiliate at all for the referral is reduced or kept low.

Also, because the identification process occurs very rapidly, the customer is unaware that the affiliate's and merchant's websites have been performing these functions. To the customer, the jump from the affiliate's website to that of the merchant is very quick and, at times, almost instantaneous.

In one embodiment, after receiving the unique session identifier 36 along with the customer, the intermediary changes and/or manipulates the session identifier that was included in the sub-domain and returned by the affiliate. In such cases, the intermediary changes the unique session identifier to a second unique session identifier when interacting with the merchant. When doing so, the intermediary generally stores both unique session identifier and the second unique session identifier in a manner permitting them to be correlated to one another. For example, both are stored in a table that associates the first unique session identifier with the second. That way, the affiliate and the merchant are further insulated from each other by the intermediary.

In addition to the above, once the identification process 34, 38 has been completed, the server-to-server exchange of information is able to freely continue throughout a shopping session and even beyond checkout to easily handle post transaction changes, returns, cancellations, modifications, shipment notifications, status notifications, and the like.

In one embodiment, information and data is exchanged 48 in an encrypted or protected form. The information and data is secured by a key, a cipher, encryption software, and the like. Also, prior to a click being generated (e.g., a link being activated), in one embodiment an anticipatory communication is made between the affiliate's server and the merchant's or a third party's server. That communication outlines how to handle any referral prior to the click.

In a further embodiment, if permitted by the customer and regulations permit, the affiliate web server plants a cookie on the customer's computer during, for example, the link activation step 28 in the event that the session is somehow lost or interrupted. Therefore, if the customer inadvertently browses directly to the merchant's website, the cookie will allow the affiliate and the customer to re-associate such that the customer will enjoy the benefits that the affiliate provides.

In addition to the above, further miscellaneous steps may be incorporated into the method and performed 52. These include, for example, dealing with shopping cart changes, completing the sale, handling cart abandonment, dealing with a transaction failure, dealing with a product return or cancellation, dealing with a break in the referral chain, researching products viewed, and the like.

While other steps may be incorporated into the method, and the steps may be rearranged, after the above-noted steps are performed the method is generally completed or ends 54.

From the foregoing, those skilled in the art will recognize that the method 10 permits the merchant to better track a particular affiliate as a source of the referral. The method 10 also permits a secure and safe exchange and/or transmission of information between the affiliate and the merchant, who each operate in the e-commerce environment, due to the fact that the unique session identifier is used to verify the identity of the affiliate and the merchant.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of conducting an electronic commerce transaction to ensure proper attribution to an affiliate by a merchant, comprising the steps of:
   sending by the affiliate a request to the merchant for the unique session identifier;
   receiving by the affiliate the unique session identifier from the merchant;
   publishing by the affiliate a link to a first website of the affiliate, the link including one of a name of the merchant or an offer from the merchant but not containing the unique session identifier;
   receiving by the affiliate activation of the link by a customer;
   redirecting the customer who activated the link to a second website of the merchant; and
   wherein the step of redirecting comprises the steps of adding by the affiliate the unique session identifier to a sub-domain portion of a domain for the merchant, and passing the customer who activated the link along with the unique session identifier to the second website of the merchant.

2. The method of claim 1, wherein the step of publishing comprises the step of creating a unique path on the first website of the affiliate associated with the merchant in a form affiliate.com/merchantname, wherein "affiliate.com" is a domain of the first website of the affiliate and "merchantname" is the name of the merchant.

3. The method of claim 1, wherein the step of publishing comprises the step of creating a unique path on the first website of the affiliate associated with the offer of the merchant in a form affiliate.com/merchantoffer, wherein "affiliate.com" is a domain of the first website of the affiliate and "merchantoffer" is the offer from the merchant.

4. The method of claim 1, wherein the step of passing the customer who activated the link along with the unique session identifier to the second website of the merchant is performed one of simultaneously or in succession.

* * * * *